United States Patent [19]

Sherman et al.

[11] Patent Number: 4,537,465
[45] Date of Patent: Aug. 27, 1985

[54] APPARATUS WITH TWO INPUT BEAMS FOR GENERATING OPTICAL SCANS

[75] Inventors: Randy J. Sherman; Derald F. Hanson, both of Phoenix, Ariz.

[73] Assignee: Lincoln Laser Company, Phoenix, Ariz.

[21] Appl. No.: 501,504

[22] Filed: Jun. 6, 1983

Related U.S. Application Data

[63] Continuation-in-part of Ser. No. 320,331, Nov. 12, 1981, Pat. No. 4,433,894.

[51] Int. Cl.$^3$ .................. G02B 27/17; G02B 27/14
[52] U.S. Cl. ............................................. 350/68; 350/274
[58] Field of Search .......................... 350/6.5–6.91, 350/6.1, 274, 320; 250/236

[56] References Cited

U.S. PATENT DOCUMENTS

| | | | |
|---|---|---|---|
| 3,212,100 | 10/1965 | Buck | 352/109 |
| 3,293,655 | 12/1966 | McNaney | 346/108 |
| 3,370,504 | 2/1968 | Buck | 88/24 |
| 3,463,882 | 8/1969 | Herbold | 178/7.6 |
| 3,488,102 | 1/1970 | Buck et al. | 350/7 |
| 3,646,568 | 2/1972 | Woywood | 350/6.8 |
| 3,809,806 | 5/1974 | Walker et al. | 178/7.6 |
| 3,818,444 | 6/1974 | Connell | 350/6.8 |
| 3,897,132 | 7/1975 | Meeussen et al. | 350/6.7 |
| 3,995,110 | 11/1976 | Starkweather | 178/7.6 |
| 4,002,830 | 1/1977 | Brown et al. | 358/293 |
| 4,054,360 | 10/1977 | Oosaka | 350/7 |
| 4,084,197 | 4/1978 | Starkweather | 358/300 |
| 4,129,355 | 12/1978 | Noguchi | 350/6.7 |
| 4,203,672 | 5/1980 | Smith, Jr. | 356/431 |
| 4,274,703 | 6/1981 | Fisli | 350/6.8 |
| 4,284,994 | 8/1981 | Radl | 346/108 |
| 4,312,590 | 1/1982 | Harbaugh | 350/6.7 |
| 4,323,307 | 4/1982 | Seeley | 350/6.5 |
| 4,413,878 | 11/1983 | Lettington | 350/6.7 |
| 4,429,948 | 2/1984 | Garwin | 350/6.8 |
| 4,458,982 | 7/1984 | Blain et al. | 350/274 |

Primary Examiner—Jon W. Henry
Attorney, Agent, or Firm—Cahill, Sutton & Thomas

[57] ABSTRACT

A system is disclosed for transforming a collimated beam of light into a beam of light which repetitively scans a fixed path by utilizing first and second mirrors repetitively rotated through a predetermined angular displacement. The angle between each mirror facet and mirror axis of rotation varies and defines a facet to axis error which is eliminated by the present invention. A first mirror receives an upper input beam and repetitively generates a first scan. A second mirror receives a lower input beam and repetitively generates a second scan. First and second redirecting means such as first and second prisms form first and second redirected scans which are ultimately reflected from the mirrors to generate a plurality of first and second output scans. A lens converges the first and second output scans onto a fixed path such that the scanner optical output beam repetitively scans the fixed path and eliminates the effect of the facet to axis errors of the first and second mirrors.

19 Claims, 44 Drawing Figures

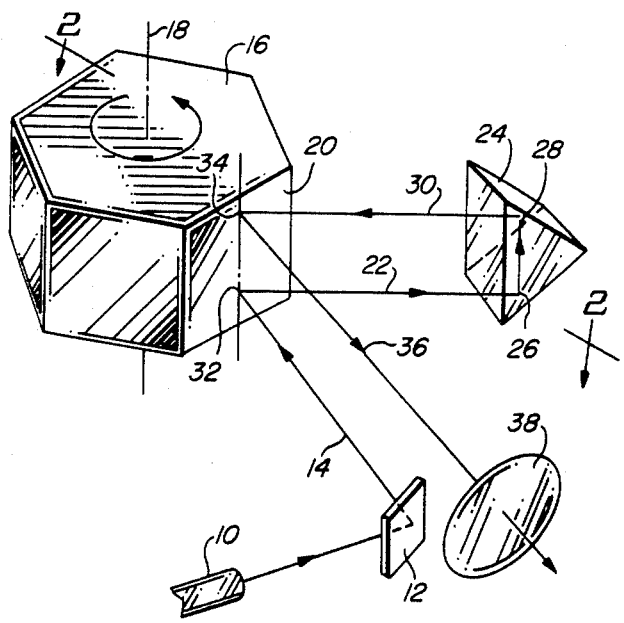
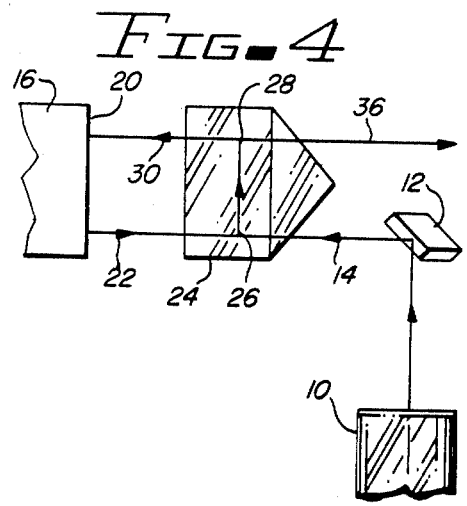
FIG.-4
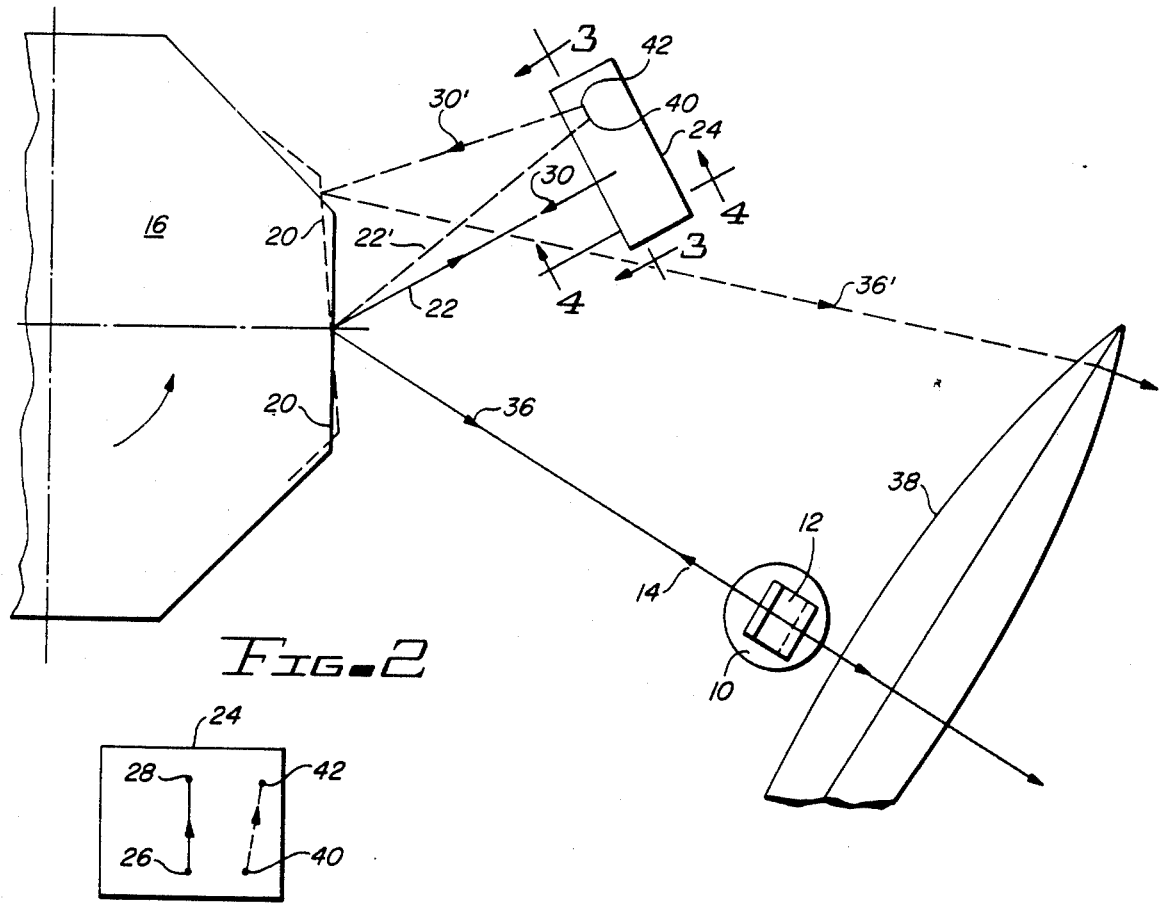
FIG.-1
FIG.-2
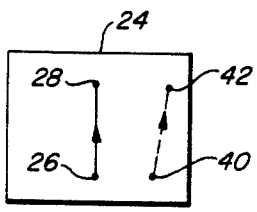
FIG.-3

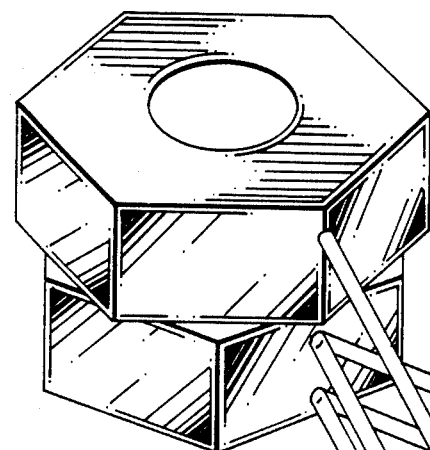
FIG-22
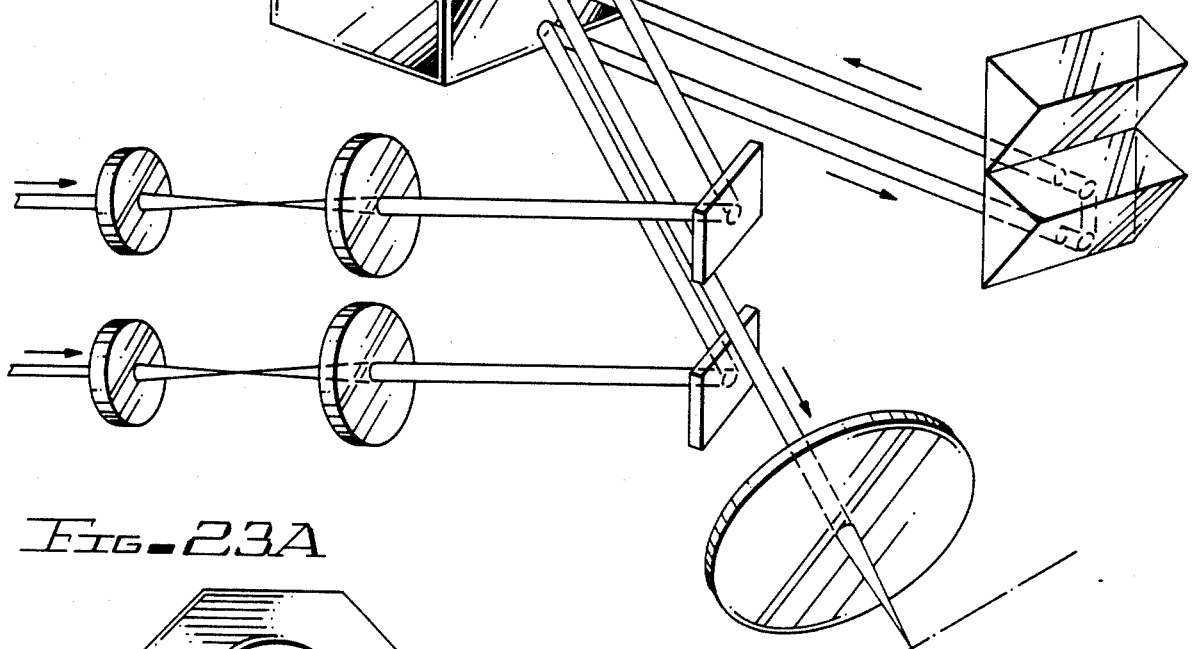
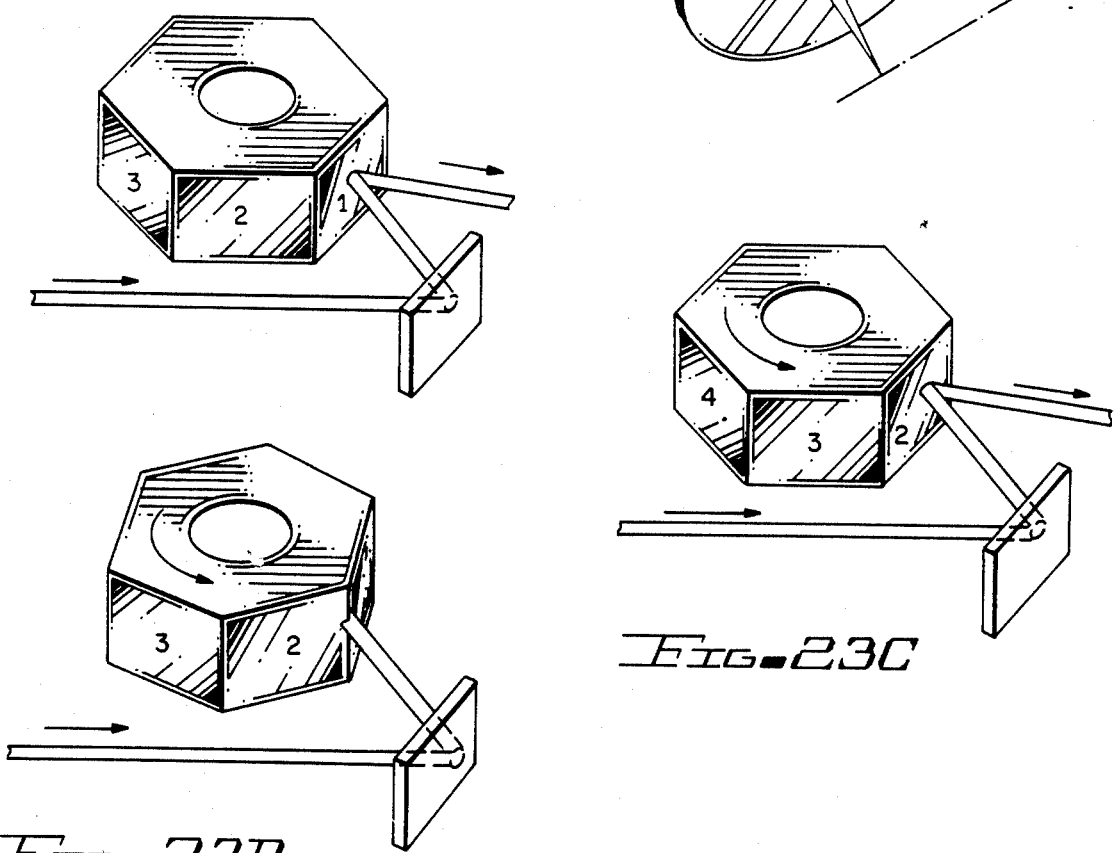
FIG-23A
FIG-23B
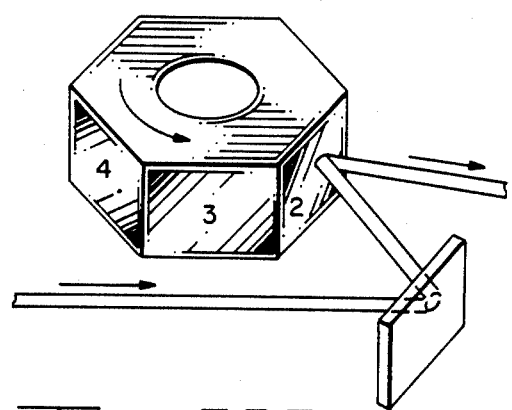
FIG-23C

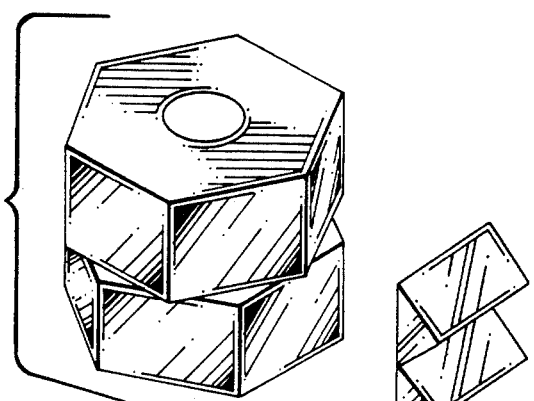
F I G . 24A
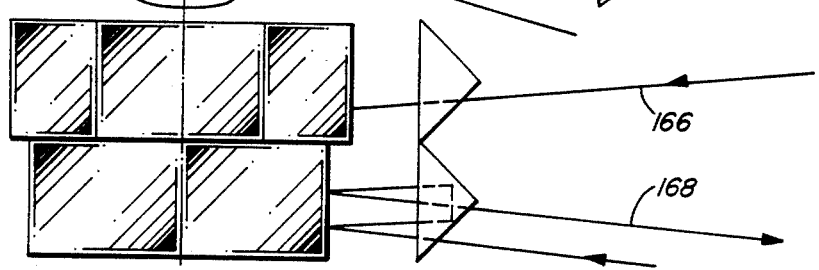
F I G . 24B
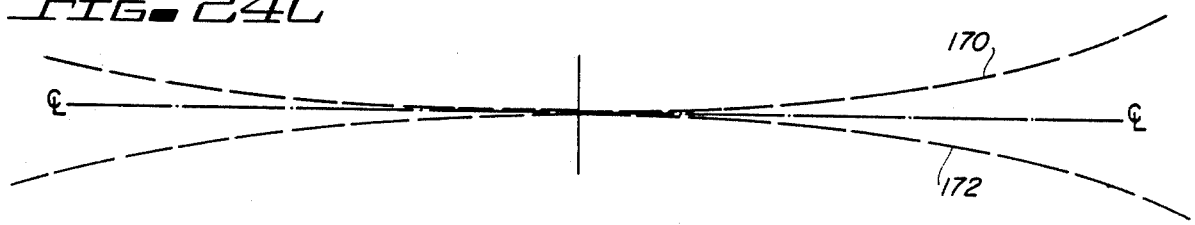
F I G . 24C
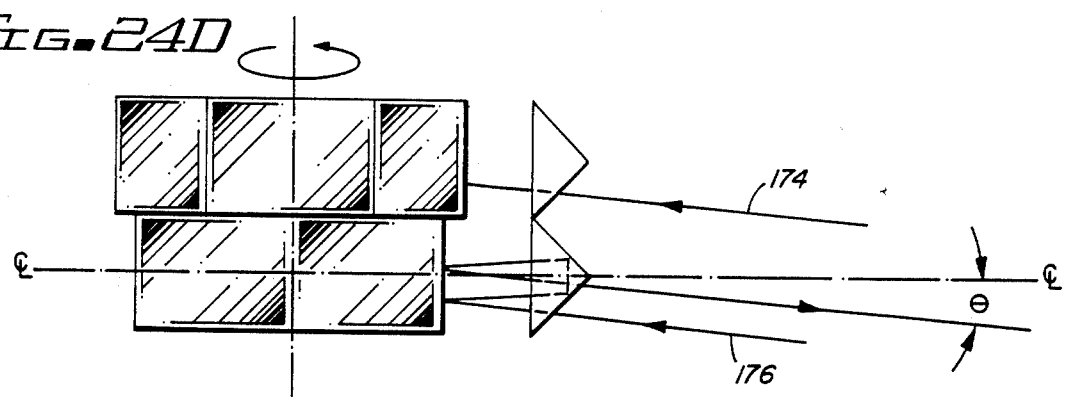
F I G . 24D
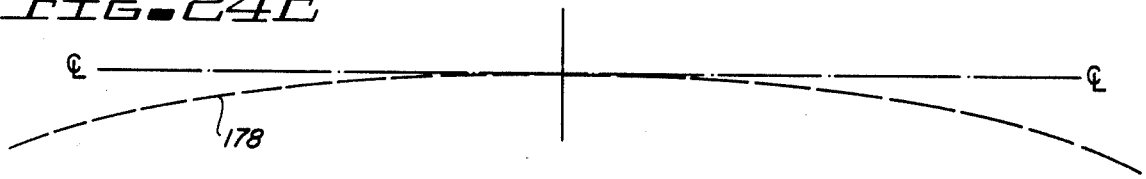
F I G . 24E

APPARATUS WITH TWO INPUT BEAMS FOR GENERATING OPTICAL SCANS

This application is a continuation-in-part of U.S. patent application Ser. No. 320,331, filed Nov. 12, 1981, now U.S. Pat. No. 4,433,894.

BACKGROUND OF THE INVENTION

1. Field of the Invention

This invention relates to optical scanning methods and apparatus, and more particularly, to an optical scanning method and apparatus which eliminates the effect of deviations in the angle between a mirror and the rotational axis of the mirror. In optical scanning devices utilizing polygon mirrors, the error eliminated by the present invention is referred to as the facet to axis error.

2. Description of the Prior Art

Mirror to rotational axis error presents serious problems in the design of precision optical scanning systems. In optical scanners utilizing polygon mirrors, the mirror facets typically are ground with a facet to rotational axis error on the order of plus or minus thirty seconds. Up to the present time, it has been possible to achieve facet to axis error tolerances of on the order of plus or minus five seconds, but achieving such close tolerances is costly, time consuming and requires an extremely high level of skill. In some optical scanner applications, it is desirable to virtually eliminate the effects of the facet to axis error of the polygon mirror so that the scanned optical output signal retraces precisly the same path during each scan.

U.S. Pat. No. 3,897,132 (Meeussen) discloses a facet to axis error correction system for a rotating polygon mirror which utilizes a corner reflector mirror in combination with a positive lens. Column 4, lines 18–21 of this patent discloses that reflective prisms may be substituted for the reflective plane mirror sur faces. Because of the relative placement of the polygon mirror, the corner reflector mirror and the positive lens, the Meeussen optical scanning device generates a curved, scanned optical output beam.

Another device for eliminating or minimizing the facet to axis error in a polygon optical scanner is disclosed in U.S. Pat. No. 4,054,361 (Noguchi). In this device, a beam of collimated light is passed through or reflected by a single optical element a first time to form a line image on the rotating polygon mirror. The reflected beam of light from the polygon mirror facet is passed through or reflected by the optical element a second time and the resulting collimated beam is passed through the image forming optical system to form a light spot on the image plane. As the polygon mirror is rotated, the light spot successively scans the image plane without any displacements of the scanning line resulting from facet to axis error.

Another system for eliminating the effects of facet to axis error is disclosed in U.S. Pat. No. 4,054,360 (Osaka). This device utilizes a polygon mirror in combination with three lenses and a planar mirror to generate a scanned optical output signal free of the effects of facet to axis errors.

U.S. Pat. Nos. 3,762,793 (Ullstig); 3,750,189 (Fleischer); 3,865,465 (Tatuoka) and 3,995,110 (Starkweather) disclose various types of optical scanning systems which utilize a first cylindrical lens positioned between a light source and a rotating polygon mirror and a second cylindrical lens positioned between the polygon mirror and a focusing lens to correct for the mirror facet to axis errors.

Another prior art system measures the facet to axis error of each mirror facet of a polygon mirror. The reflected output beam from the polygon mirror is passed through an acoustic modulator which is programmed to correct the deviation of the beam from each mirror facet by an amount precisely equal to the facet to axis error of each facet of the polygon mirror. This system is only capable of correcting for static errors and cannot correct dynamic facet to axis errors caused by polygon mirror support bearing deflections or thermally generated errors.

In another related prior art system, a feedback compensation system detects errors in the beam of light reflected from the leading edge of each facet of a rotating polygon mirror. A correction signal is generated which controls an acoustic modulator to compensate for non-repeatable, dynamic errors. This prior art feedback compensation system is not capable of correcting for facet to axis errors which take place during the scan of a mirror facet and therefore cannot completely eliminate facet to axis errors.

SUMMARY OF THE INVENTION

It is therefore a primary object of the present invention to provide an optical scanning method and apparatus which utilizes only one or a pair of inexpensive, fixed optical elements to completely eliminate the effect of facet to axis errors on the scanned optical output beam generated by the optical scanner.

Another object of the present invention is to provide an optical scanning method and apparatus which can generate either a linear or a curved scanned optical output beam.

Yet another object of the present invention is to provide an optical scanning method and apparatus which can be utilized in combination with an optical feedback system to scan a target and to detect defects in the target.

Still another object of the present invention is to provide an optical scanning method and apparatus fabricated from standard, commercially available components.

Still another object of the present invention is to provide an optical scanning method and apparatus which can correct for mirror to rotational axis errors of at least one half of one degree.

Briefly stated, and in accord with one embodiment of the invention, an optical scanner generates an optical output beam which repetitively scans a fixed path by utilizing a mirror which is repetitively rotated through a predetermined angular displacement. The angle between the mirror axis of rotation and the mirror varies between each mirror deflection and defines a mirror rotational axis error. An input light beam is directed onto the rotating mirror along a first path to produce a first scanned reflected output beam for each rotation of the mirror. A second scanned reflected output beam is generated during each rotation of the mirror by redirecting the first scanned reflected output beam through a prism and back onto the mirror along a second path. The second path is vertically displaced from the first path by a distance related to the mirror rotational axis error. Each point at which the second scanned reflected output beam intercepts the mirror is laterally offset from a corresponding point at which the input light beam intercepts the mirror by a distance related to the relative angle between the mirror and the input light beam. A third scanned reflected output beam is generated by reflecting the second scanned reflected output beam from the mirror. Repetitive rotations of the mirror produce a plurality of third scanned reflected output beams which define a grouping of non-coincident surfaces which are also non-intersecting with respect to the input light beam. The plurality of third scanned reflected output beams are converged onto the fixed path such that the optical output beam repetitively scans the fixed path without any perceptible effects caused by the mirror rotational axis error.

DESCRIPTION OF THE DRAWINGS

The invention is pointed out with particularity in the appended claims. However, other objects and advantages together with the operation of the invention may be better understood by reference to the following detailed description taken in connection with the following illustrations wherein:

FIG. 1 is a perspective view of the elements of the optical scanner of the present invention.

FIG. 2 is a view from above of the optical scanner illustrated in FIG. 1, taken along section line 2—2.

FIG. 3 is a sectional view of the prism illustrated in FIG. 2, taken along section line 3—3.

FIG. 4 is a sectional view of the optical scanner illustrated in FIG. 2, taken along section line 4—4.

FIG. 22 depicts a dual mirror optical scanner which receives two separate optical input signals.

FIGS. 23A-C depict the manner in which an optical input signal transitions from a first mirror facet to a second mirror facet.

FIGS. 24A-E depict the effect of various orientations of an optical input signal on the optical output scan generated by the optical scanner of the present invention.

DESCRIPTION OF THE PREFERRED EMBODIMENT

Figure 5:
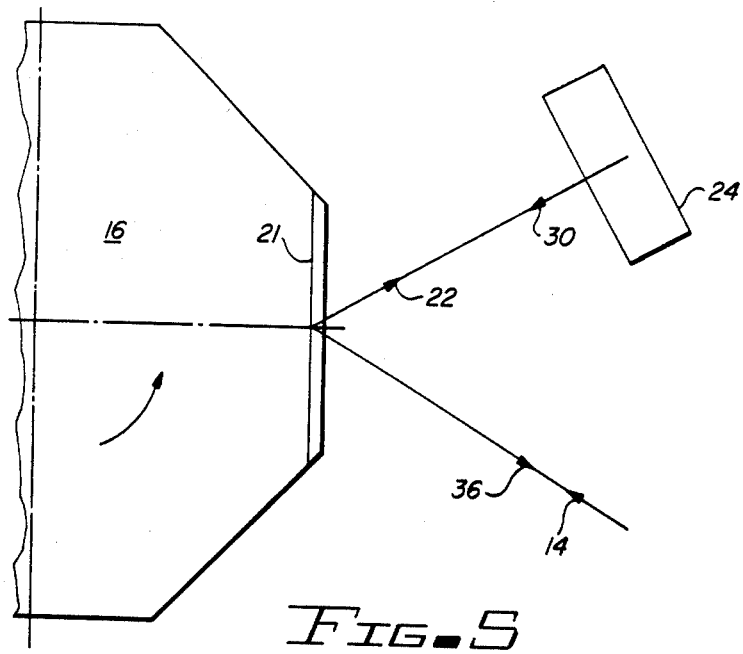
FIG. 5 is a view from above of an optical scanner utilizing a polygon mirror having a significant facet to axis error.

In order to better illustrate the advantages of the invention and its contributions to the art, a preferred hardware embodiment of the invention will now be described in some detail.

Referring now to FIGS. 1 and 2, a beam of collimated light is generated by a laser 10 or equivalent device. The collimated light beam is reflected by a relay mirror 12 to form an input light beam 14 which is directed onto the facets of a rotating polygon mirror 16. The rotational axis of mirror 16 is indicated by the vertically oriented line designated by reference number 18.

In FIG. 2, the solid line depiction of mirror facet 20 corresponds to a mirror facet positioned at the midpoint of a scan. The dotted line depiction of mirror facet 20 illustrates a further counter-clockwise rotational displacement of polygon mirror 16.

In the facet mid-position depicted in FIGS. 1 and 2, input light beam 14 strikes mirror facet 20 at a point equi-distant from the two vertical edges of the facet. The reflection of input light beam 14 from mirror facet 20 at this mid-position produces a first scanned reflected output beam 22 which is directed into the lower portion of the hypotenuse facet of an internal reflecting right angle prism 24. FIGS. 1 and 3 illustrate that first beam 22 is reflected upward by a first face of prism 24 at a point designated by reference number 26. This vertically oriented light beam then strikes the second face of prism 24 at a point designated by reference number 28 and is redirected back toward mirror facet 20 to form a second scanned reflected output beam designated by reference number 30. Since in FIGS. 1–3 mirror facet 20 is shown at its mid-position, the point designated by reference number 32 where input light beam 14 strikes mirror facet 20 and the point designated by reference number 34 where the second scanned reflected output beam 30 strikes mirror facet 20 are vertically aligned with one another.

Second scanned reflected output beam 30 is reflected at point 34 from the face of mirror facet 20 and generates a third scanned reflected output beam 36. The third scanned reflected output beam 36 is directed through converging means in the form of a positive lens 38 and is focussed onto a fixed path on a target which is repetitively scanned by the scanned output beam generated by the optical scanner.

FIG. 4 represents an elevational view of the optical scanner depicted in FIGS. 1 and 2 and illustrates that the horizontal axis of polygon mirror 16 and the midpoint of prism 24 are oriented in the same plane and are orthogonal to each other. Input light beam 14 travels below the third scanned reflected output beam 36. Since mirror facet 20 is illustrated as having a facet to axis error of zero, FIGS. 1 and 4 clearly depict that both input light beam 14 and first scanned reflected output beam 22 lie in the same horizontal plane while the second scanned reflected output beam 30 and the third scanned reflected output beam 36 lie in another horizontal plane.

The dotted line depiction of mirror 16 in FIG. 2 illustrates facet 20 at a point after it has been rotated beyond its mid-position. With this mirror facet rotational orientation, first scanned reflected output beam 22 is angularly deflected to a second position designated by reference number 22'. FIG. 3 illustrates that first scanned reflected output beam 22' strikes the lower surface of prism 24 at a point designated by reference number 40 and is deflected upward and laterally outward to a point designated by reference number 42 where the light beam is redirected back toward mirror facet 20 to form an angularly displaced second scanned reflected output beam designated by reference number 30'. Upon reflection from mirror facet 20, these rays become the third scanned reflected output beam 36 which is focussed by lens 38.

Figures 10A, 11A:
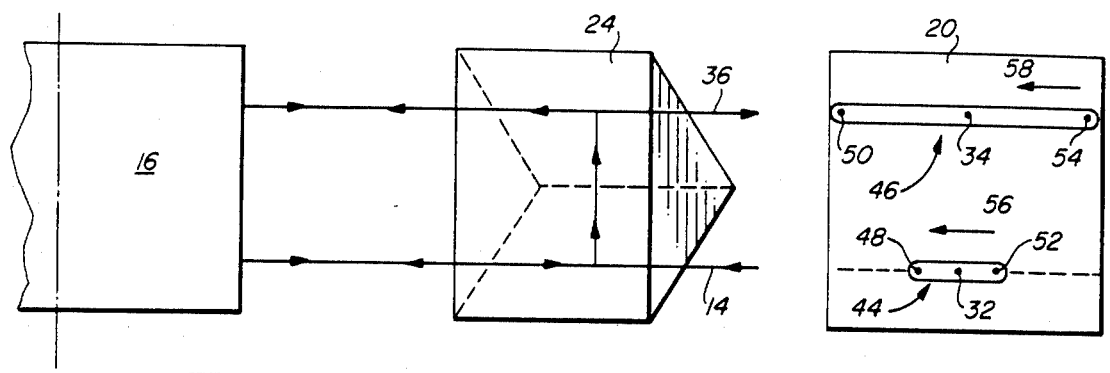
FIGS. 11A-C correspond respectively to FIGS. 10A-C and depict the travel path of the various light beams between the polygon mirror and the prism of the optical scanner.

FIG. 10A depicts the first path 44 travelled by input light be 14 across the face of mirror facet 20 while reference number 46 depicts the second path which corresponds to the optical track of second scanned reflected output beam 30 across the face of mirror facet 20. As in FIG. 1, reference number 32 designates the point at which input light beam 14 strikes mirror facet 20 when mirror facet 20 is at its mid-position, while reference number 34 designates the point at which the corresponding second scanned reflected output beam 30 strikes mirror facet 20. Reference number 48 designates the position of input light beam 14 which generates a second scanned reflected output beam 30 at the lateral edge of mirror facet 20 as is designated by reference number 50. Reference numbers 52 and 54 designate corresponding positions of input light beam 14 and second scanned reflected output beam 30 at the beginning of a scanned output trace. The arrows designated by reference numbers 56 and 58 indicate the direction of travel of input light beam 14 and second scanned reflected output beam 30 across the face of mirror facet 20 which defines respectively a first path 44 and a second path 46.

FIG. 10A also indicates that input light beam 14 traces a path designated by the dotted line segments lying on either side of first path 44, but does not generate a first scanned reflected output beam 22 which intercepts the face of prism 24. These dotted line scan segments therefore correspond to dead time and do not create a usable scanned output signal. Because the third scanned reflected output signal is reflected twice from each mirror facet, its angular rate of deflection is effectively increased or "amplified." Third scanned reflected output beam 36 is angularly deflected at a rate four times faster than the rate of rotation of polygon mirror 16. Third scanned reflected output beam 36 is deflected by each mirror facet through the same arc as in a conventional optical scanner, although it is deflected through this arc in one-half the time. The remaining scan time corresponds to the dead time depicted in FIG. 10A.

Figure 6:
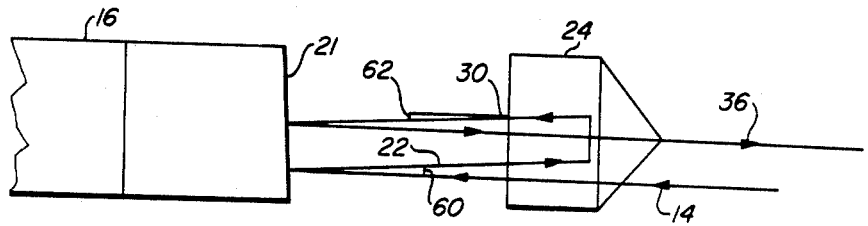
FIG. 6 is a view from the side of the optical scanner illustrated in FIG. 5, particularly illustrating the reflection error created by the mirror facet to axis error and the corrective effect of the prism on this error.

Referring now to FIGS. 5 and 6, input light beam 14 is incident upon mirror facet 21 of polygon mirror 16. Mirror facet 21 has a predetermined facet to axis error as is evidenced by the fact that the upper surface of facet 21 is closer to rotational axis 18 of mirror 16 than is the lower surface of mirror facet 21. This orientation of facet to axis error will be referred to as "negative error" since the surface of mirror facet 21 has essentially been rotated in a counterclockwise direction from a zero facet to axis error position. The term "positive error" will be utilized to refer to what is equivalent to a clockwise rotation of the surface of mirror facet 21 and occurs when the upper surface of mirror facet 21 is positioned at a greater distance from rotational axis 18 than the lower surface of mirror facet 21. FIGS. 5 and 6 depict mirror facet 21 at its rotational mid-position.

Since mirror facet 21 is no longer perpendicular to input light beam 14, first scanned reflected output beam 22 will be reflected upward at an angle equal to twice the negative error of mirror facet 21. In FIG. 6, reference number 60 indicates the upward deflection angle of first scanned reflected output beam 22 caused by the negative facet to axis error of mirror facet 21.

First scanned reflected output beam 22 is directed onto the hypotenuse face of prism 24 and is redirected through the prism toward mirror facet 21 to generate second scanned reflected output beam 30. The normal operation of prism 24 causes second scanned reflected output beam 30 to be precisely parallel to first scanned reflected output beam 22. While first scanned reflected output beam 22 had an error angle designated by reference number 60 which was displaced above a horizontal plane, second scanned reflected output beam 30 will have an error angle designated by reference number 62 which is equal but opposite to error angle 60. Thus prism 24 has effectively reversed the sign of the error angle so that when second scanned reflected output beam 30 is reflected a second time from the face of mirror facet 21 to generate third scanned reflected output beam 36, the error caused by this second reflection from the face of mirror facet 21 will exactly cancel the error induced by mirror facet 21 during the generation of the first scanned reflected output beam 22. The third scanned reflected output beam 36 will therefore be vertically displaced from, but precisely parallel to, input beam 14.

If we assume that input light beam 14 is horizontally oriented and define the angle between input light beam 14 and first scanned reflected output beam 22 to be equal to $+E$, the angle of second scanned reflected output beam 30 with respect to input light beam 14 will be equal to $-E$. Since the reflector of second scanned output beam 30 from mirror facet surface 21 will add an error equal to $+E$ to second scanned output beam 30, the following angular reorientation will take place as beam 30 is reflected to become beam 36:

$$-E+E=0$$

The above equation mathematically confirms the parallel alignment between input beam 14 and third scanned reflected output beam 36. For any given positive or negative facet to axis error, prism 24 will in all cases reverse the sign of the facet to axis error as it generates the second scanned reflected output beam 30. This error is then cancelled out by a second reflection of the light beam from the mirror facet being scanned. The result in all cases will be the generation of a third scanned reflected output beam 36 which is parallel to, but spaced apart from input light beam 14.

Thus repetitive deflections of input light beam 14 by the facets of polygon mirror 16 generate or define a family or grouping of non-coincident surfaces each of which is defined by the deflection of third scanned reflected output beam 36 from each mirror facet. These family of surfaces are also non-intersecting with respect to input light beam 14 as a result of the upward translation of the light beam as it passes through prism 24.

Figures 10B, 11B:
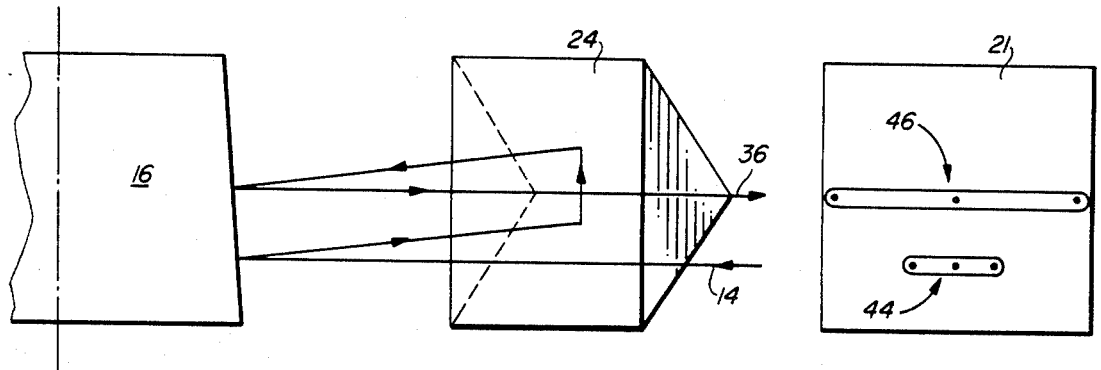

FIG. 10B depicts the downward displacement of second path 46 along the face of facet 21 caused by the negative facet to axis error of facet 21 as illustrated in FIGS. 5 and 6.

Figures 10C, 11C:
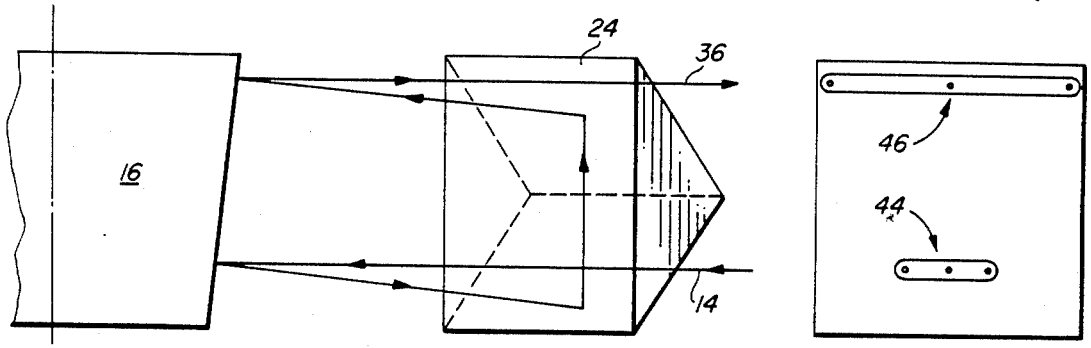
Figure 12:
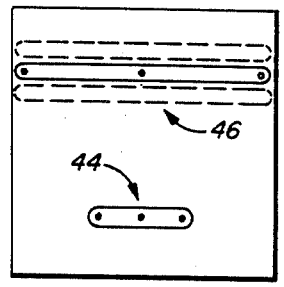
FIG. 12 depicts a family of non-coincident surfaces of the type which might be created by facet to axis errors in the optical scanner embodiment depicted in FIG. 1.

FIG. 10C depicts the upward displacement of second path 46 along the face of a mirror facet caused by a positive facet to axis error. FIGS. 11A-C correspond respectively to FIGS. 10A-C and depict the facet to axis error and the effect of that error on the spacing between the first and second paths traced across the respective mirror facet.

As is clearly evident from an inspection of FIGS. 10A-C and 11A-C, the optical scanning system of the present invention can accommodate facet to axis errors up to a predetermined limit. Beyond that limit, the second path travelled by the second scanned reflected output beam will be displaced either above or below the mirror facet and the optical scanning system will cease to function. It is estimated that the optical scanning system of the present invention can accommodate facet to axis errors of at least plus or minus five degrees. An optical scanner which utilizes a polygon mirror having an increased vertical dimension in combination with a larger prism may be able to accommodate even larger facet to axis errors.

Figure 7:
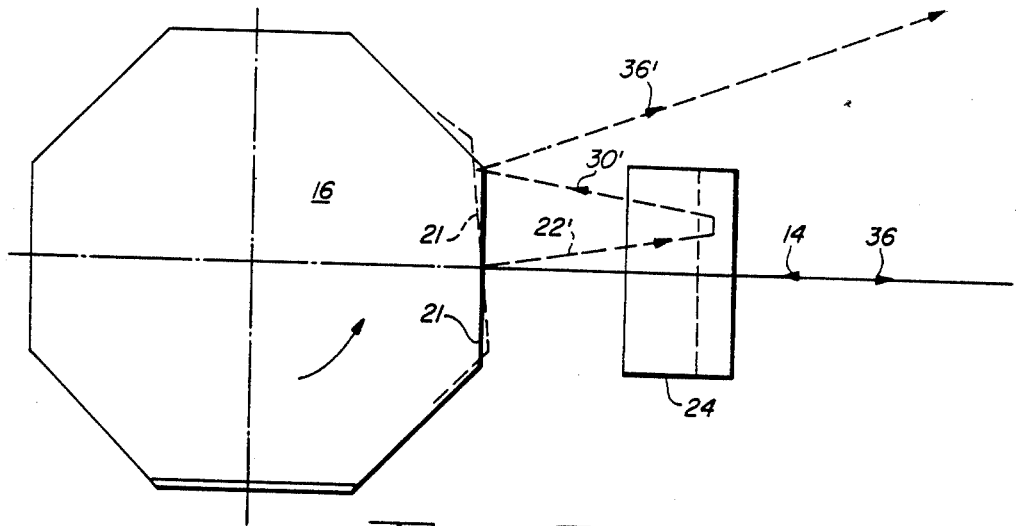
FIG. 7 is a second view of the optical scanner illustrated in FIG. 5, particularly illustrating the polygon mirror rotated in a counterclockwise direction from the neutral position illustrated in FIG. 5.
Figure 8:
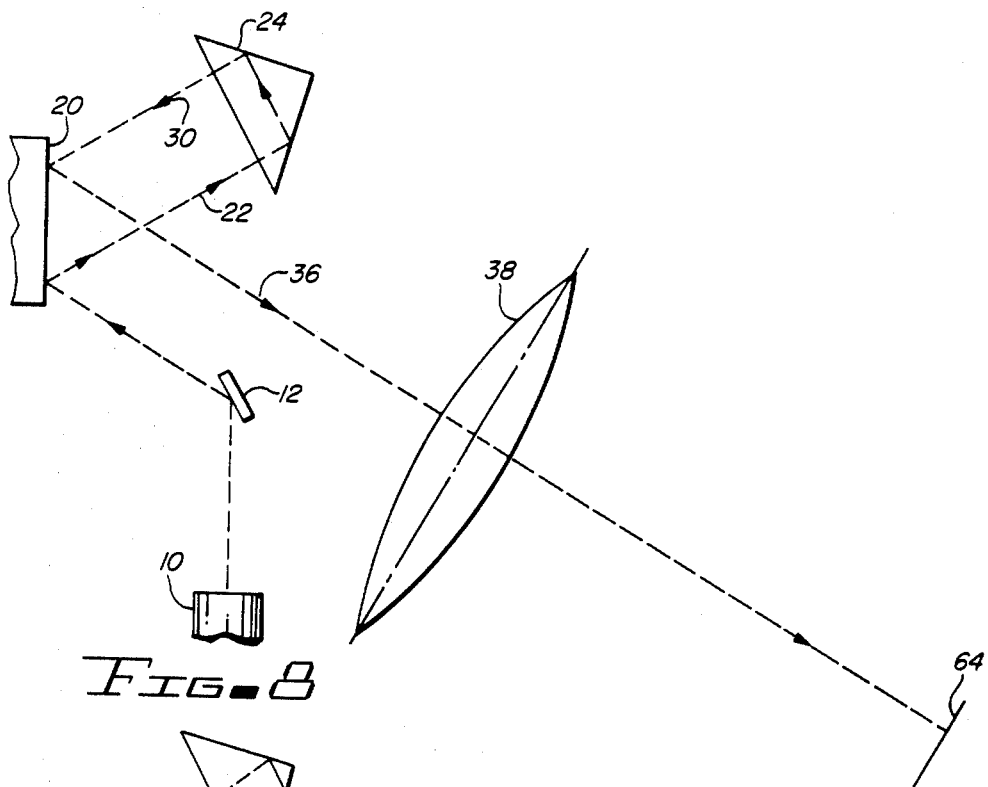
FIG. 8 is an elevational view of a second embodiment of the optical scanner of the present invention, particularly illustrating the path travelled by the optical beam when the facet to axis error of the polygon mirror is equal to zero.
Figure 9:
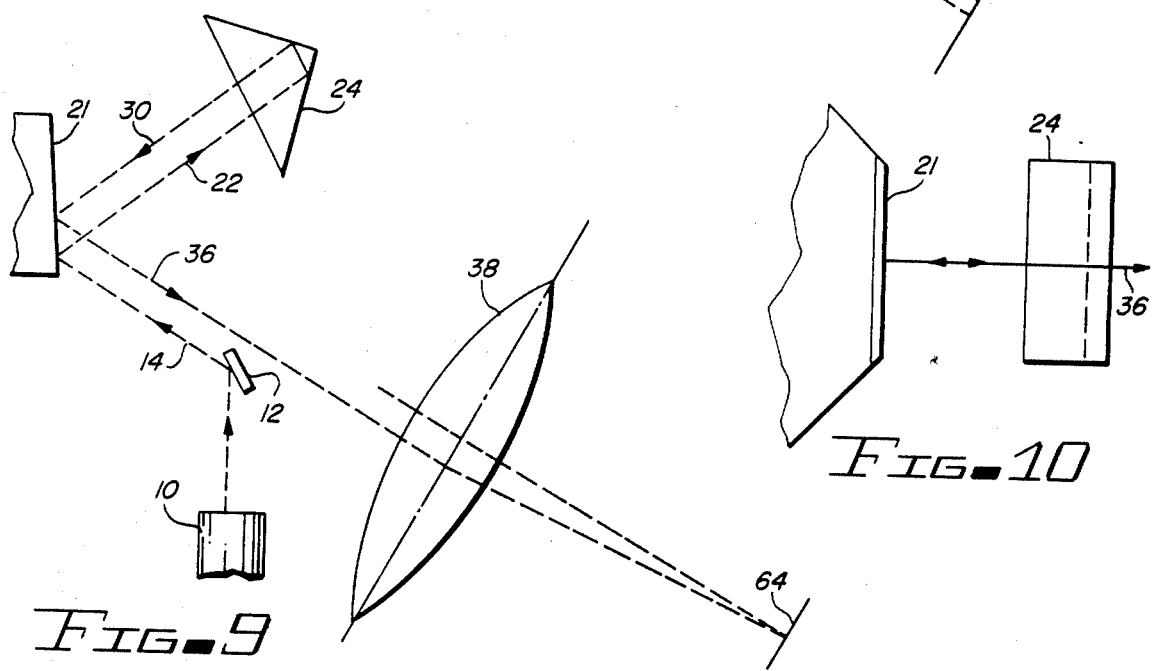
FIG. 9 is an elevational view of a second embodiment of the optical scanner of the present invention, particularly illustrating the path travelled by the optical beam when a significant facet to axis error exists.
Figure 10:
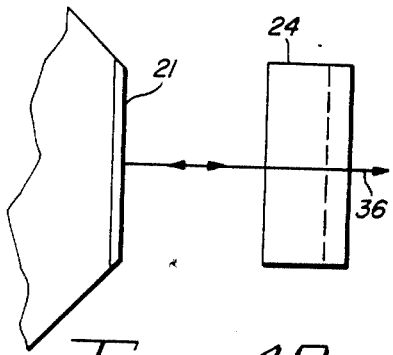
FIGS. 10A-C depict the first path of the input light beam and the second path of the second scanned reflected output beam for zero, negative and positive facet to axis errors.

Referring now to FIGS. 7-10, a second embodiment of the optical scanner of the present invention will be described. This second embodiment utilizes a prism 24 which is positioned above the plane of polygon mirror 16 and converging means in the form of positive lens 38 which is positioned below the plane of polygon mirror 16. Laser 10 and relay mirror 12 are also positioned below the plane of polygon mirror 16. Similar reference numbers have been utilized in connection with the illustration of this second embodiment to indicate similar structural elements of the optical scanner. FIGS. 7 and 8 illustrate the operation of this second embodiment of the optical scanner when a mirror facet 20 is presented which includes a facet to axis error equal to zero. FIGS. 9 and 10 depict the relative relationships between input light beam 14 and the various scanned reflected output beams caused by a mirror facet 21 having a negative facet to axis error.

Figure 13:
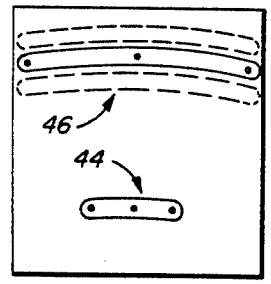
FIG. 13 depicts a curved family of non-coincident surfaces of the type which might be created by facet to axis errors in the optical scanner embodiment depicted in FIG. 8.

FIG. 13 illustrates that the modified positioning of the various elements of this second embodiment of the optical scanner causes input light beam 14 to generate a curved first path 44 on the rotating facet of the polygon mirror. For the same reason, second scanned reflected output beam 30 will trace a family of curved, non-intersecting surfaces on the rotating facets of the polygon mirror. The family of curved third scanned reflected output beams 36 pass through positive lens 38 which is designed to cause the family of parallel oriented, non-intersecting surfaces to converge into a single curved scanned output beam which is repetitively scanned across target 64.

Prism 24 is a conventional internal reflecting right angle prism in which the adjacent sides of the prism have a tolerance of plus or minus one tenth of one wavelength. In the preferred embodiment of the invention, prism 24 has a one inch hypotenuse face span and a width of three quarters of an inch from end to end. The hypotenuse face should include an anti-reflective coating to prevent unwanted reflection of first scanned output beam 22. Alternatively, prism 24 may be slightly rotated with respect to rotational axis 18 of mirror 16 or it may be fabricated with a slight pyramidal error in the hypotenuse to prevent unwanted reflections.

In both the FIG. 1 and FIG. 9 embodiments, the angle defined by a line extending from prism 24 to mirror facet 20 to positive lens 28 is equal to sixty degrees. Prism 24 is spaced thirty degrees above or laterally away from a line perpendicular to the facet of polygon mirror 16, while positive lens 38 is positioned on a line displaced laterally or below that same perpendicular line. Lens 38 is spaced away from polygon mirror 16 as required to insure that it collects and refracts the most widely deflected third scanned reflected output beam 36. As is evident from FIG. 2, prism 24 must be positioned so that its lower edge does not interfere with the most widely deflected third scanned reflected output beam 36. Once the spacing between lens 38 and the target of the scanned optical output beam have been determined, the refracting power of lens 38 can be set to precisely converge the scanned optical output beam on the target.

In the preferred embodiment of the present invention, a twenty-four sided rotating mirror having a 4.75 inch spacing between opposing facets and a facet height of one inch is utilized.

Figure 14:
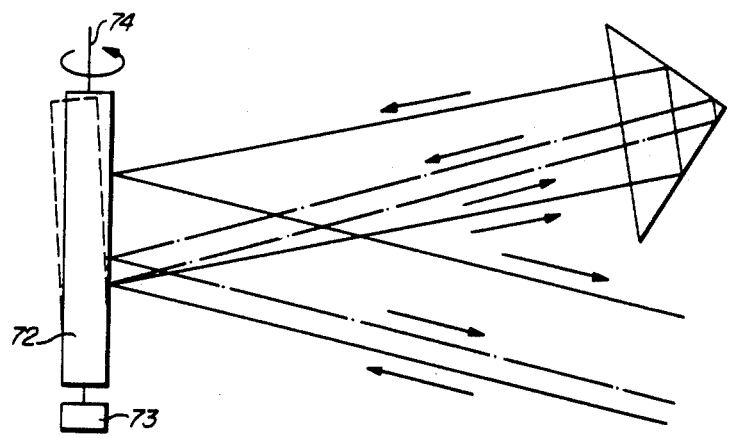
FIG. 14 depicts the configuration of an optical scanner incorporating a planar mirror which is rotated back and forth within a defined arc by a galvanometer movement coupled to the mirror.

FIG. 14 depicts a planar mirror 72 which is deflected or rotated back and forth within a defined arc by a galvanometer movement 73 coupled to the mirror. The compensation system of the present invention will eliminate variations in the angle between the plane of mirror 72 and its axis of rotation 74 as the mirror is rotated. The errors imparted to the galvanometer driven mirror are equivalent to facet to axis errors in a polygon mirror system and are therefore eliminated by the present invention. The dotted line representation of mirror 72 illustrates the type of mirror position errors corrected by the present invention.

In yet another embodiment of the invention, one may utilize a single mirror facet coupled to the edge of a rotating disc. Dynamic displacement of the mirror facet will generate rotational axis errors equivalent to the facet to axis error discussed above and will be eliminated by the present invention. The present invention will also eliminate facet to axis errors created by mirrors rotated by other means such as a tuning fork, a cam or other rotating device.

Figure 15:
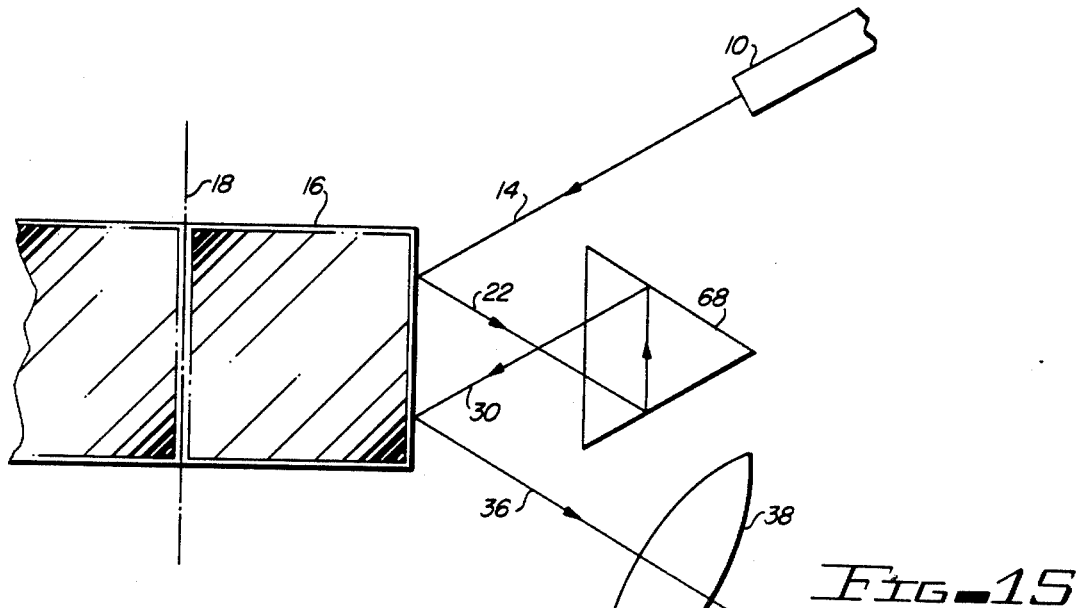
FIG. 15 illustrates an embodiment of the optical scanner incorporating an equilateral prism.

FIG. 15 depicts another configuration of the optical scanner in which an equilateral prism 68 is substituted for a ninety degree prism. As indicated, laser 10, prism 68 and positive lens 38 must be repositioned to permit the optical scanner to function in accordance with the teachings of the present invention. Various other prism configurations can be utilized if the input light source, lens and prism are properly positioned with respect to polygon mirror 16.

Figure 16:
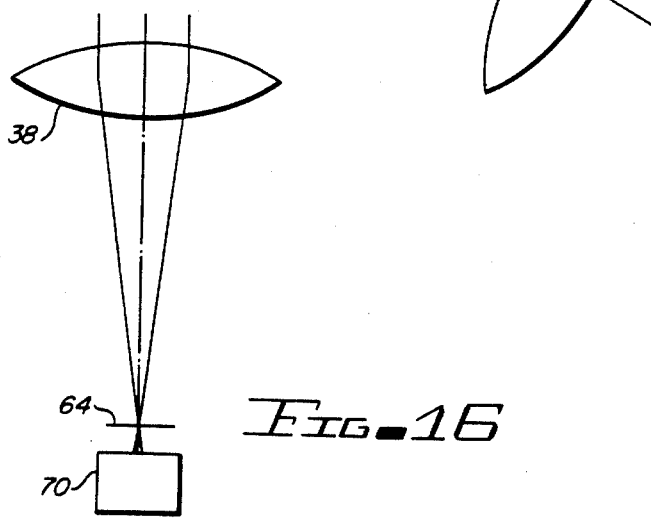
FIG. 16 depicts an optical scanning system which includes a detector for measuring the effect of a target on the scanned optical output beam.

Referring now to FIG. 16, target 64 comprises an optically transmissive surface scanned by the optical output beam. An optical detector 70 can be positioned adjacent the rear surface of target 64 as illustrated in FIG. 16 or, alternatively, can be positioned to receive light reflected from the scanned surface of target 64. Detector 70 measures variations in the intensity of the transmitted or reflected beam to detect imperfections in the surface of target 64, to read information stored on target 64 or to accomplish various other functions which are well known to those skilled in the art.

Figure 17:
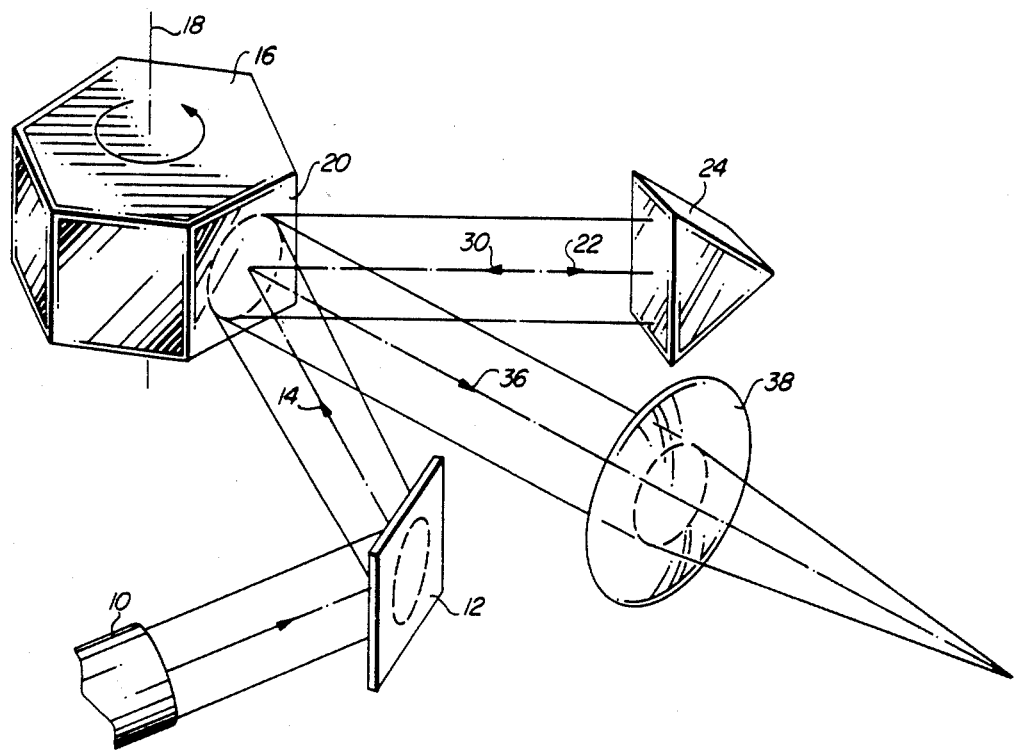
FIG. 17 illustrates an optical scanner which converts a large diameter input light beam into a scanned optical output beam.

FIG. 17 illustrates that the optical scanning system of the present invention may utilize a broad input beam 14 having a diameter on the order of the facet height of polygon mirror 16. The first scanned reflected output beam 22 and the second scanned reflected output beam 30 are essentially coincident with one another, but travel in opposing directions. The third scanned reflected output beam 36 is directed through and converged by positive lens 38 exactly as has been described above.

The optical scanner of the present invention may be used as an element of an image generating device. In this configuration, the intensity of the output signal from laser 10 is modulated as the scanned output signal from the optical scanner is deflected across a photosensitive material. The photosensitive material is displaced at the end of each scan so that an entire image can be rapidly recreated on the photosensitive surface.

Figure 18:
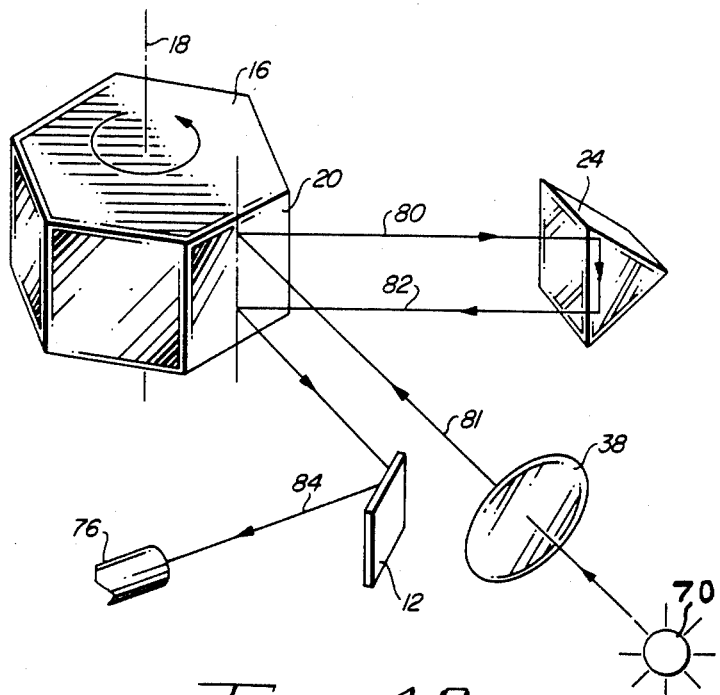
FIG. 18 illustrates an optical scanning device which is configured to function as a receiver to detect photon sources lying within the scanner field of view.

FIG. 18 indicates that a detector 76 can be substituted for laser 10. In this configuration, the optical scanner of the present invention functions as a receiving device to indicate the presence, intensity and azimuth of a photon source 78 which lies within the scanner field of view. The scanner field of view is defined by the various mirror parameters, but in a high speed polygon mirror scanner having twenty-four facets, the field of view may be on the order of fifteen degrees. A synchronization circuit is typically coupled to the rotating mirror in order to determine the relative angular position of the mirror during each scan for the purpose of indicating the azimuth of photon source 78.

Detector 76 normally includes an image intensification device such as a telescope and a beam collimator in combination with a photon detector which is sensitive to the wavelength or range of wavelengths of interest. In the receiving mode, positive lens 38 collects and converges the diverging radiant energy rays from source 78 into a substantially collimated beam 81 and directs that collimated beam onto the surface of mirror facet 20. The reflection of the collimated beam from the surface of mirror facet 20 produces a first scanned reflected collimated beam 80 which travels into prism 24. Prism 24 redirects the first scanned reflected collimated beam 80 back onto the surface of mirror facet 20 along a second path to generate a second scanned reflected collimated beam 82. The second scanned reflected collimated beam 82 is reflected again from the surface of mirror facet 20 and is directed into detector 76. Reference number 84 designates the output beam which is reflected from relay mirror 12 and directed into detector 76. Output beam 84 maintains a constant angular position with respect to the vertical plane of the optical scanner as a result of the facet to axis error correction compensation system of the present invention.

FIGS. 10A-C, 11A-C and 12 are directly analogous to the operation of the optical scanner receiver depicted in FIG. 18 except that the arrows indicating the direction of travel of the various optical beams in FIG. 11 must be reversed.

It will be apparent to those skilled in the art that the disclosed optical scanner may be modified in numerous other ways and may assume many other emdodiments in addition to the various preferred forms specifically set out and described above. Accordingly, it is intended by the appended claims to cover all such modifications of the invention which may fall within the true spirit and scope of the invention.

Figure 19A:
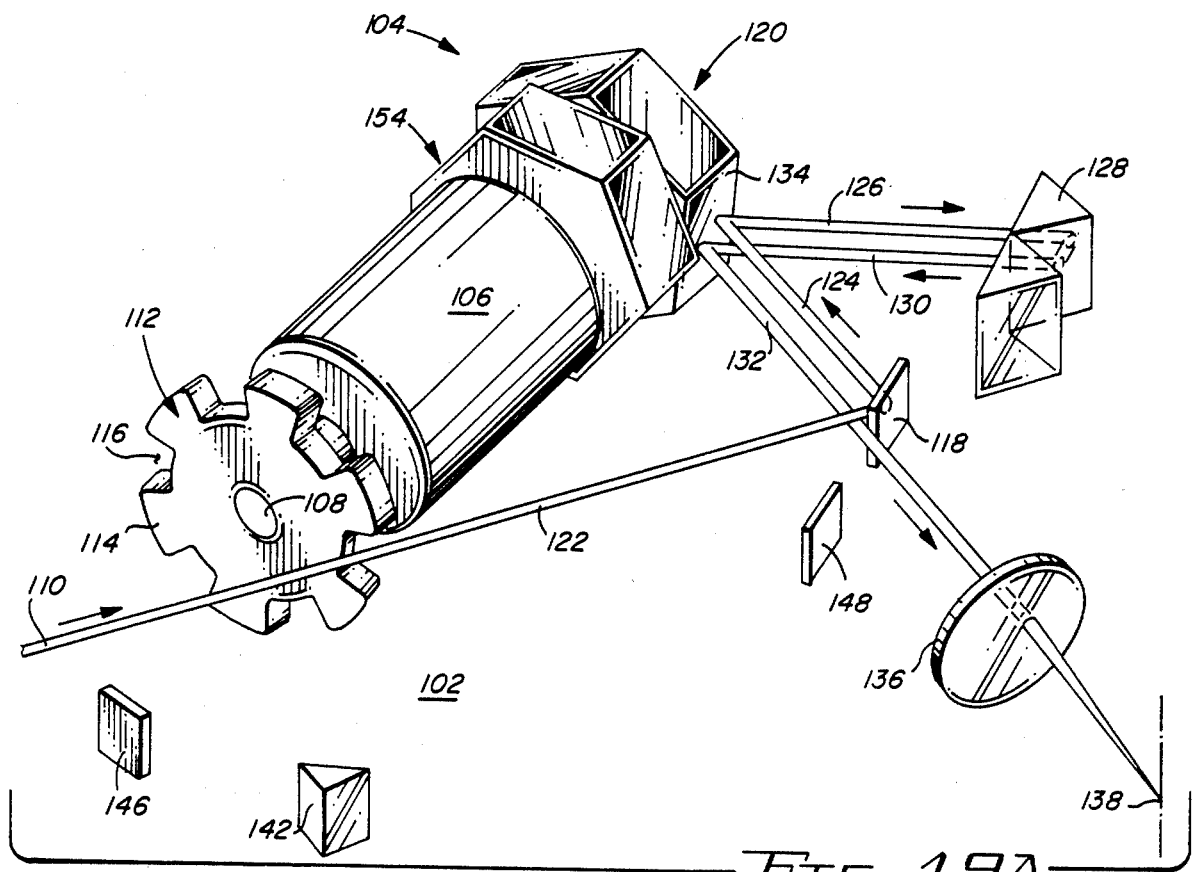
FIGS. 19A and B represent perspective views of a dual mirror embodiment of the optical scanner which includes an optical beam pulse generator for sequentially directing a single input signal onto the facets of an upper polygon mirror and a lower polygon mirror.
Figure 19B:
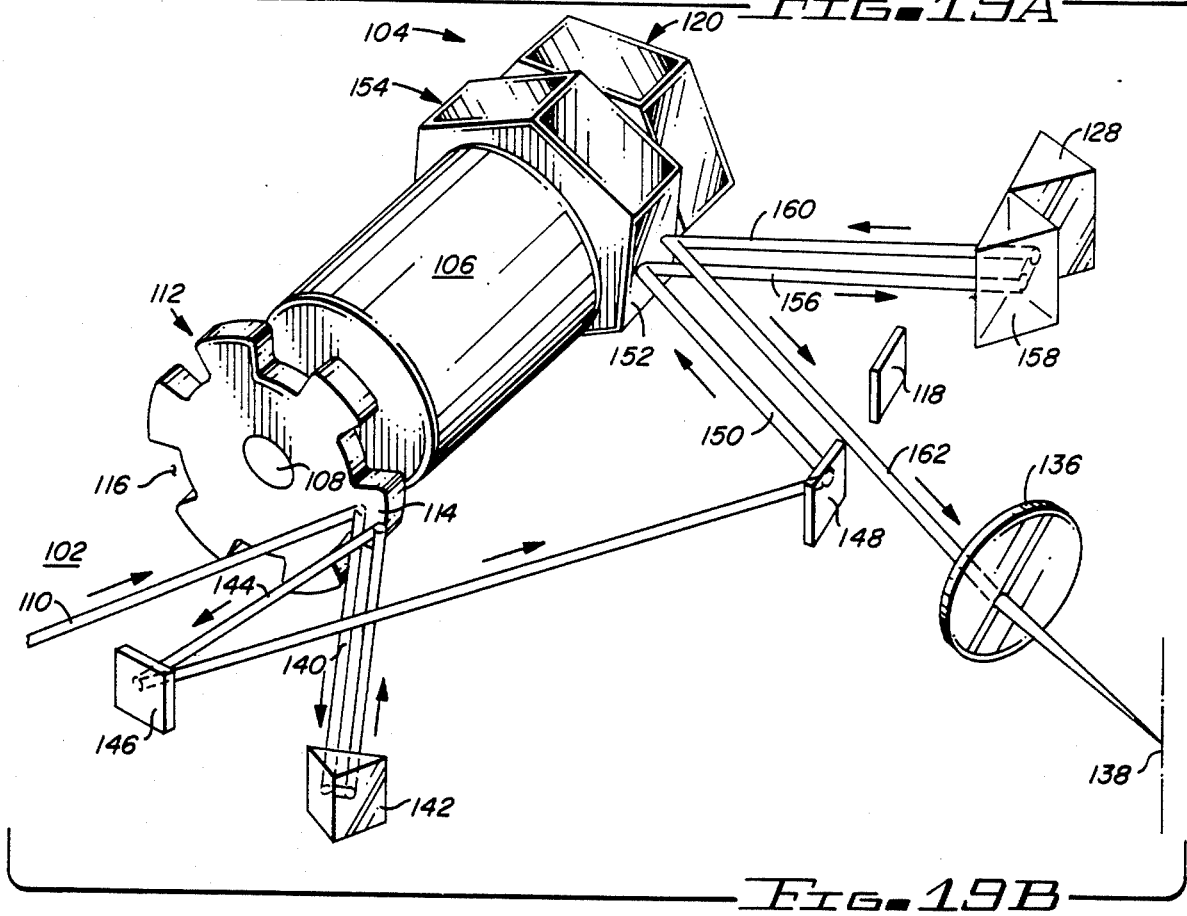

Referring now to FIGS. 19A and 19B, a more complex and sophisticated version of the optical scanner invention will now be described in detail. This embodiment uses a pair of synchronized mirrors to double the scan efficiency of the optical scanner in comprison to the single mirror optical scanner embodiment described above.

The optical scanner depicted in FIG. 19 includes two cooperative, but distinct elements. The first element will be referred to as an optical beam pulse generator 102 and the second element includes a dual mirror optical scanner 104. An electric motor 106 includes an output shaft 108, the lower end of which drives beam pulse generator 102 and the upper end of which drives optical scanner 104.

An input light beam 110 is generated by a laser or equivalent device and is directed as indicated onto segmented reflecting means in the form of segmented mirror 112. Segmented mirror 112 includes a plurality of spaced apart mirror facets 114 which each include a potentially different facet to axis error. In the embodiment depicted in FIG. 19, segmented mirror 112 takes the form of a cogged wheel which includes a gap 116 between each pair of adjacent mirror facets 114.

When the optical scanner is in the position depicted in FIG. 19A, input light beam 110 passes through gap 116 and is reflected by relay mirror 118 onto a facet of first polygon mirror 120. This particular configuration of input light beam 110 is designated as pulsed non-reflected output beam 122 of beam pulse generator 102 since beam 122 is sequentially interrupted by segmented mirror 112, yet is not reflected by the mirror facets 114 of mirror 112. The reflection of beam 122 by relay mirror 118 forms the upper input beam 124 which is sequentially directed onto the mirror facets of first polygon mirror 120. The rotational displacement of first polygon mirror 120 converts upper input beam 124 onto first scan 126 which is directed into first redirecting means 128.

First redirecting means 128 redirects the first scan 126 back onto first polygon mirror 120 to form a first redirected scan 130 in the manner described in connection with the single mirror embodiment above. First redirected scan 130 is reflected from first polygon mirror 120 to generate a plurality of first output scans 132 which define a family of non-coincident surfaces. The first redirected scan 130 is vertically displaced from first scan 126 by a distance related to the facet to axis error of mirror facet 134 of first polygon mirror 120. The first redirected scan 130 is laterally displaced from first scan 126 by a distance related to the relative angle between mirror facet 134 and upper input beam 124. First output scan 132 intercepts converging means or lens 136 which converges the family of first output scans 132 onto a fixed path 138.

FIG. 19B depicts the optical scanner in a position in which segmented mirror 112 has rotated to a point where mirror facet 114 intercepts and reflects input beam 110, generating pulsed beam 140 which is directed into redirecting means 142. Redirecting means 142 redirects pulsed beam 140 back onto mirror facet 114 where it is reflected from that mirror facet a second time to generate pulsed reflected output beam 144.

Pulsed reflected output beam 144 intercepts relay mirrors 146 and 148. The reflection of pulsed reflected output beam 144 from relay mirror 148 generates lower input beam 150 which is directed onto mirror facet 152 of second polygon mirror 154.

The reflection of lower input beam 150 by mirror facet 152 generates second scan 156 which is redirected by second redirecting means 158 to form a second redirected scan 160. The reflection of second redirected scan 160 by mirror facet 152 generates a plurality of second output scans 162 which pass through and are converged by converging means 136 onto fixed path 138.

The phase angle between first polygon mirror 120 and second polygon mirror 154 can be adjusted as desired to create an optical output beam which has the appropriate pulse width characteristics for a specific application. The optical beam pulse generator depicted in FIG. 19 can be readily fabricated and can be assembled in a highly compact unit. The economics realized by utilizing a single electric motor 106 to drive both optical scanner 104 as well as beam pulse generator 102 are apparent. The output shaft 108 of motor 106 defines the vertical axis of the system solely for the purpose of reference in the detailed description of the invention. Motor 106 and shaft 108 can be positioned with any desired orientation with substantially no effect on the operation of the optical scanner invention.

Redirecting means 128, 142 and 158 typically take the form of ninety degree prisms which are commercially available and comparatively inexpensive. Redirecting means in other forms such as corner reflector mirrors can be substituted for prisms in a manner well known to one of ordinary skill in the art. In optical beam pulse generator 102, prism 142 is required only to eliminate facet to axis errors created by mirror facets 114. If segmented reflecting means 112 is of an extremely high quality where facet to axis errors are negligible, redirecting means 142 can be eliminated. Prism 142 has been depicted in FIG. 19 in a position shifted to the right of its actual operating position to simplify and clarify the drawing. Correct prism alignment can be readily determined by trial and error positioning.

A significant advantage of this particular embodiment of the invention is that the power of each scanned output beam is equal to the full power of each separate optical input signal. Any scanning devices incorporating a beam splitter which operates to divide a single input signal into two or more component parts inherently suffers degraded performance caused by a substantial loss in power of the scanned output signal.

Figure 20:
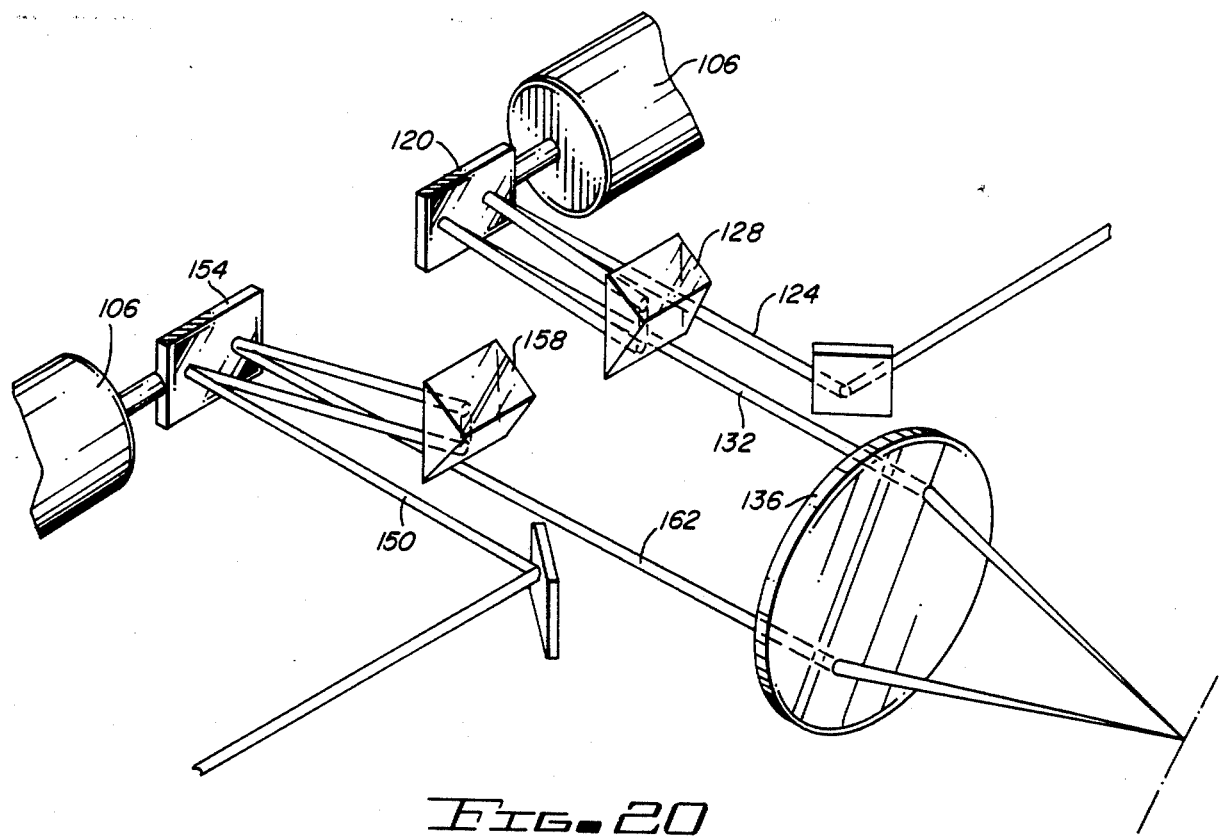
FIG. 20 is a perspective view of a galvanometer driven, planar mirror embodiment of the dual mirror optical scanner of the present invention.

FIG. 20 depicts a substantially different embodiment of the invention depicted in FIG. 19 but operates in substantially the same way to achieve substantially the same results as the optical scanner depicted in FIG. 19. In the embodiment depicted in FIG. 20, a pair of galvanometer driven mirrors 120 and 154 have been substituted for polygon mirrors 120 and 154. The FIG. 20 embodiment also achieves doubled scan efficiency in comparison to the embodiment of the invention disclosed in FIGS. 1-18 above.

Figure 21:
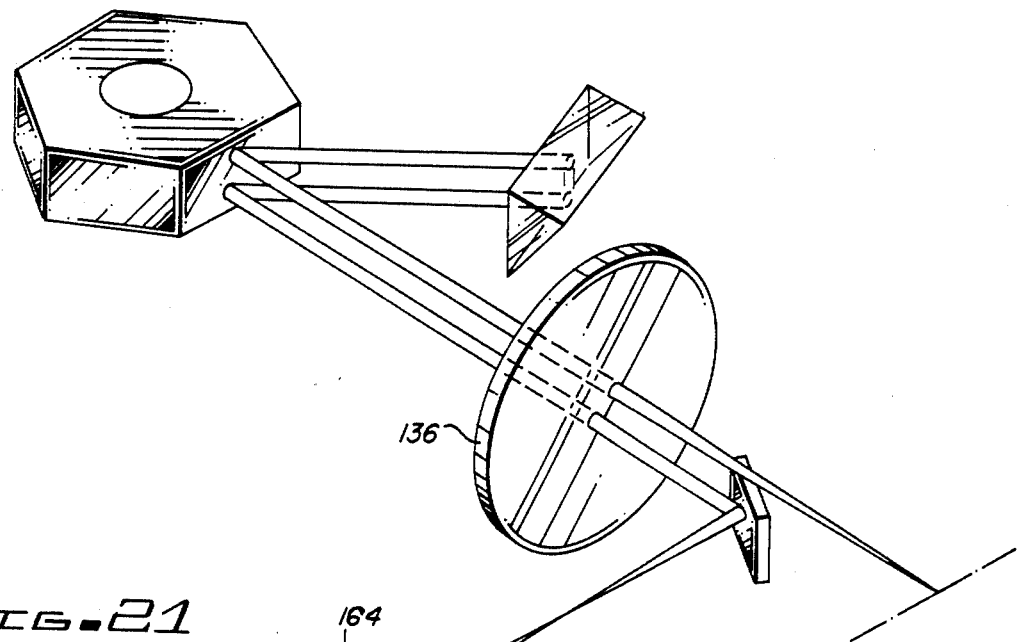
FIG. 21 depicts an embodiment of the present invention which utilizes a single converging means to converge the optical output signal from the scanner and to form a part of a telescopic beam expander for the input signal.

FIG. 21 depicts a simplified, single mirror embodiment of the invention which utilizes converging lens 136 as the second optical element of a beam expander or telescope formed from lens 164 and lens 136. This beam expander configuration can be utilized either with the single or double mirror embodiments of the present invention.

FIG. 22 illustrates another version of the dual mirror embodiment of the present invention in which two different light input sources are provided in lieu of the optical beam pulse generator configuration depicted in FIG. 19. In the FIG. 22 embodiment, the two separate optical input signals can be of different wave lengths or can be of other distinctive characteristics.

FIGS. 23A, B and C illustrate the manner in which an optical input signal is reflected from and transitions between two adjacent facets of a polygon mirror.

Referring now to FIGS. 24A-E, the effect of different optical input signal configurations on the characteristic of the optical output beam are depicted. FIG. 24A represents a perspective view showing the configuration of first and second redirecting means with respect to first and second mirrors. FIG. 24B depicts a first input signal 166 which intercepts the facets of first polygon mirror 120 from a position off axis above, while a second input signal 168 intercepts the facets of polygon mirror 154 from a position off axis below. FIG. 24C indicates that input signal 166 produces a curved output scan 170, while input signal 168 generates a curved output scan 172.

FIG. 24D depicts parallel input beams 174 and 176 intercepting the facets of mirrors 120 and 154 from a position off axis below to generate the curved output scan 178 depicted in FIG. 24E.

Figure 25:
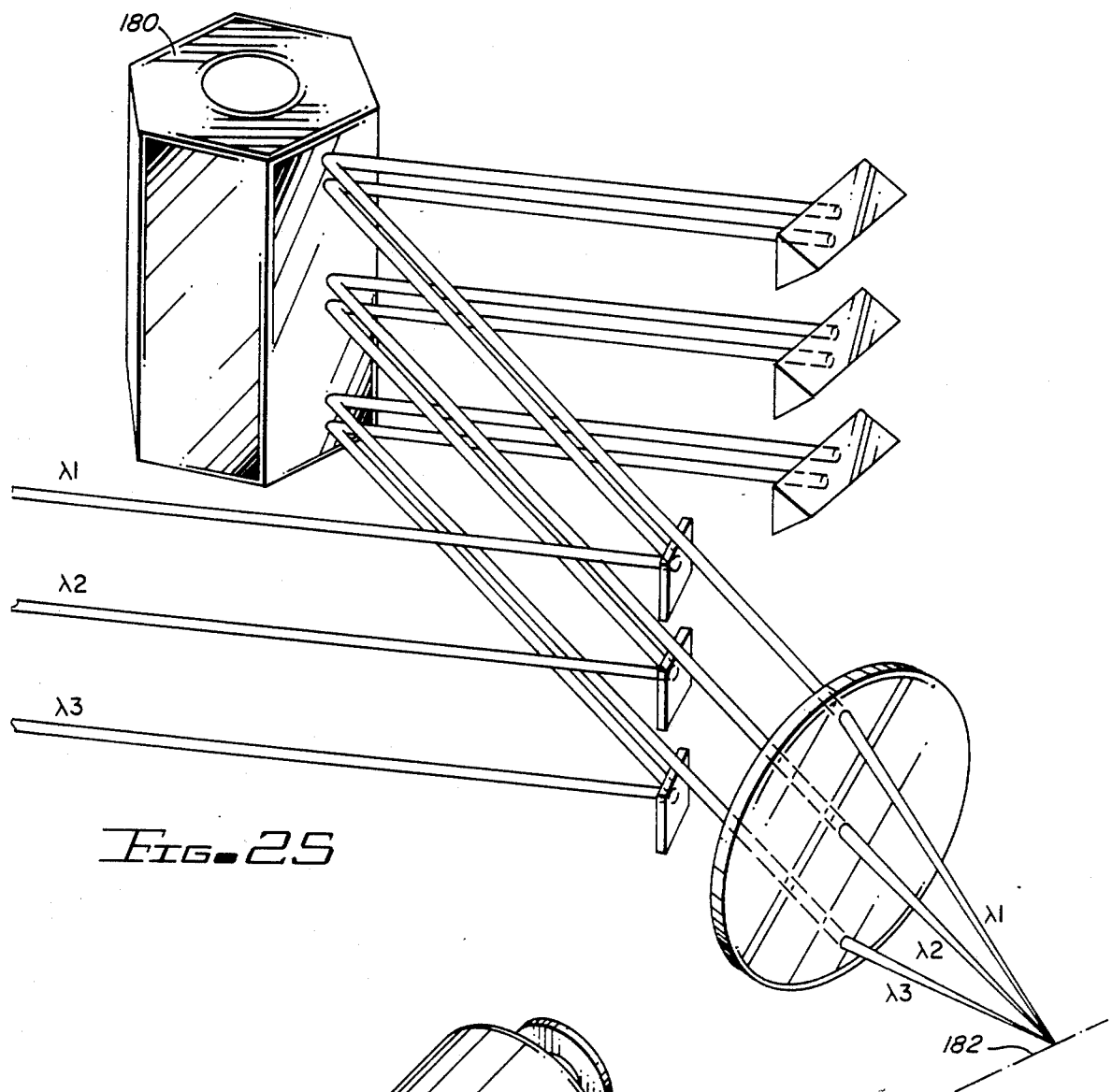
FIG. 25 depicts a single mirror optical scanner which is capable of receiving a plurality of independent input signals and processing each input signal through separate redirecting means.

FIG. 25 illustrates yet another embodiment of the present invention which essentially comprises a hybrid of the single mirror optical scanner depicted in FIG. 1 and the dual mirror optical scanner depicted in FIG. 19. In the FIG. 25 embodiment, the phase angle between polygon mirrors 120 and 154 of FIG. 19 has essentially been set equal to zero, yielding a single polygon mirror 180 having a plurality of extremely long facets. Two, three or more input light beams, each having potentially different wave lengths or other optical characteristics, are directed onto the facets of polygon mirror 180 and are redirected by two, three or more redirecting means back onto the facets of polygon mirror 180. The single scanned optical output beam produced by the FIG. 25 embodiment includes all three optical input signals. A scanner embodiment of this type could be used for a number of different purposes including the generation of the horizontal component of a television raster scan. The vertical deflection of such a three color output signal could be added at any convenient point such as the line designated by reference No. 182.

Since all of the optical scanner embodiments describe above can be used to scan in either a transmit or receive mode, all such scanners can be used to inspect surfaces illuminated by a coherent light source. In the inspection embodiment, an item such as a printed circuit board being examined for defects is incrementally displaced past the scan plane by a device such as a stepper motor. An information processing device is substituted for the light input sources described above in connection with the transmitting version of the present invention.

Figure 26:
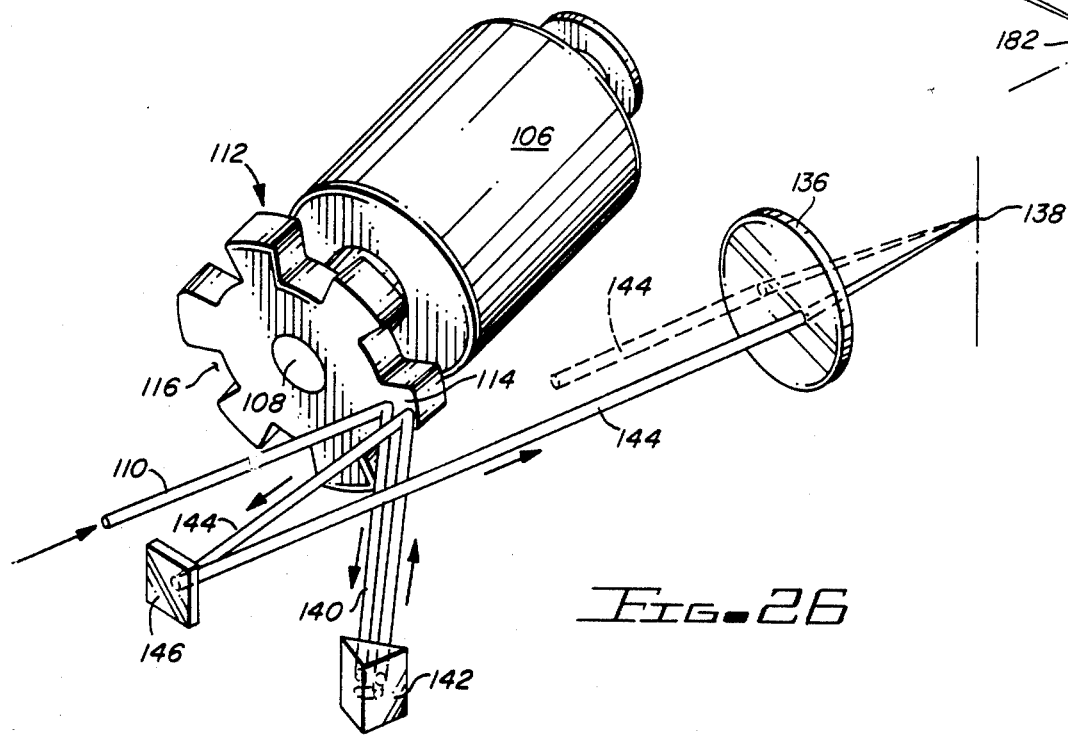
FIG. 26 is a perspective view of an optical beam pulse generator which does not operate in conjunction with an optical scanner.
Figure 27:
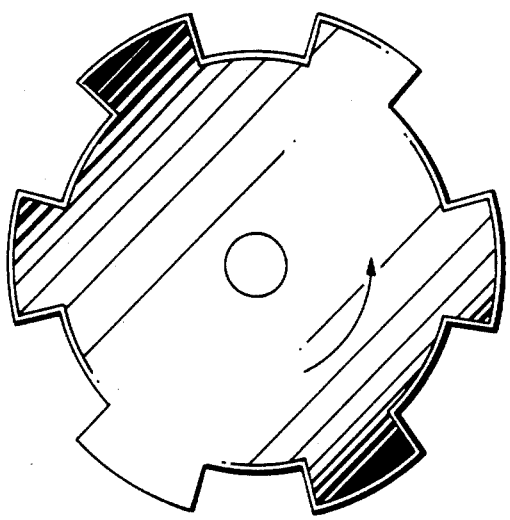
FIGS. 27, 28A, 29, 30A and 31 depict various embodiments of segmented mirror 112 usable with the present invention. Segmented mirror 112 depicted in FIG. 29 is supported and driven by the group of three idler wheels that contact the circumference of the mirror.

FIG. 26 depicts an optical beam pulse generator of the type described in connection with FIG. 19. This embodiment includes a single lens 136 to converge the pulsed reflected output beam 144. The pulsed non-reflected output beam 122 (not shown) does not require converging since it is merely a chopped output beam without facet to axis errors.

Figure 28A:
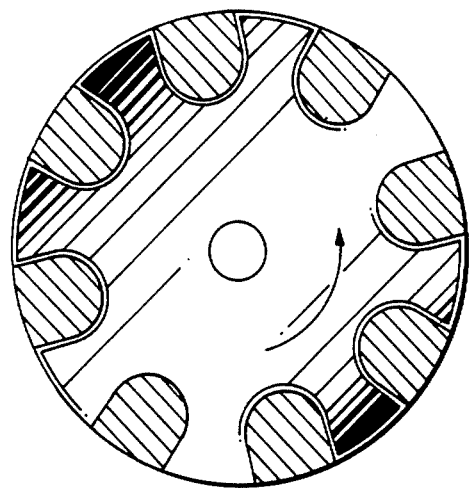
Figure 29:
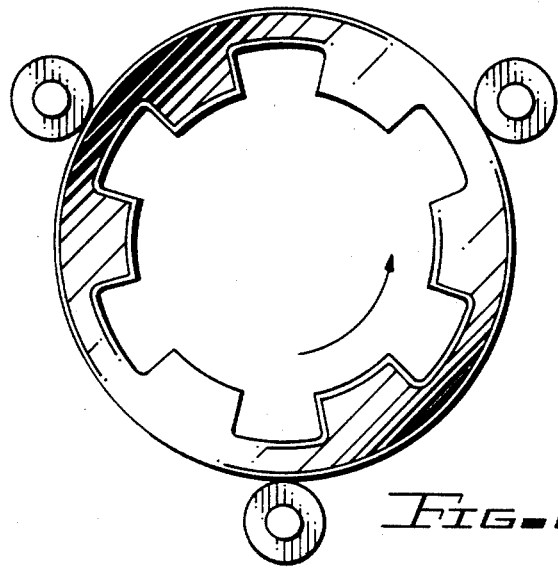
Figure 30A:
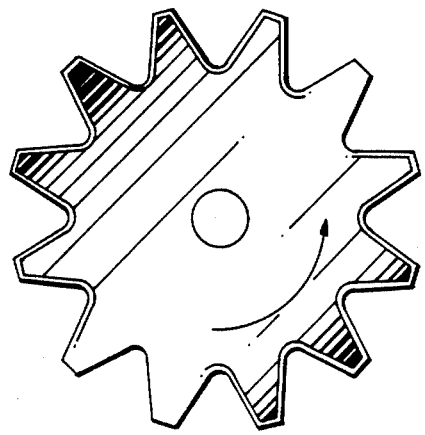
Figure 31:
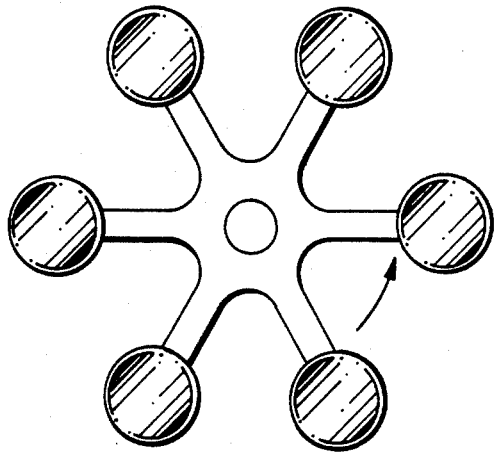
Figure 28B:
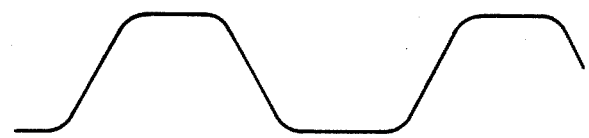
FIGS. 28B and 30B indicate the amplitude variations in the output signal generated by the mirror sections of segmented mirror 112.
Figure 30B:
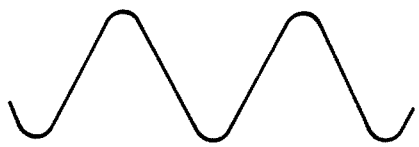

FIGS. 27, 28A, 29, 30A and 31 depict various other embodiments of segmented mirror 112 which are compatible with the beam pulse generator of the present invention. The diagonally shaded areas of the segmented mirror 112 depicted in FIG. 28A represent reflective areas. The segmented mirror 112 depicted in FIG. 29 is supported and driven by the three idler wheels that contact the circumference of the mirror. In FIG. 31, each of the round mirrors may be glued to or otherwise secured to the arms of segmented mirror assembly 112. The extreme facet to axis errors created by such a crude form of mirror coupling will be eliminated by the unique and automatic compensation system of the present invention. The cost of fabricating such a segmented mirror 112 is extremely low.

It will be apparent to those skilled in the art that the various embodiments of the optical scanner and beam pulse generator inventions described above may be modified in numerous ways and may assume many other embodiments in addition to the various preferred forms described in FIGS. 19-30. Accordingly, it is intended by the appended claims to cover all such modifications of the invention which may fall within the true spirit and scope of the invention.

We claim:

1. An optical scanner for receiving an input beam and for generating an optical output beam which repetitively scans a fixed path comprising:
   a. means for converting a single input beam into alternating upper and lower input beams;
   b. a first mirror repetitively rotated through an angle about a vertically oriented first axis for receiving the upper input beam and for repetitively generating a first scan;
   c. a second mirror repetitively rotated through an angle about the first axis for receiving the lower input beam and for repetitively generating a second scan, said first and second mirrors having a relative phase angle greater than zero and random facet to axis errors;
   d. first means for redirecting the first scan back onto the first mirror to form a first redirected scan, wherein the first redirected scan is reflected from the first mirror to generate a plurality of first output scans which define a family of non-coincident surfaces, said family of surfaces being non-intersecting with respect to the upper input beam, the first redirected scan being vertically displaced from the first scan by a distance related to the mirror facet to axis error and laterally displaced from the first scan by a distance related to the relative angle between the mirror and the upper input beam;
   e. second means for redirecting the second scan back onto the second mirror to form a second redirected scan, wherein the second redirected scan is reflected from the second mirror to generate a plurality of second output scans which define a family of non-coincident surfaces, said family of surfaces being non-intersecting with respect to the lower input beam; the second redirected scan being vertically displaced from the second scan by a distance related to the mirror facet to axis error and laterally displaced from the second scan by a distance related to the relative angle between the mirror and the lower input beam; and
   f. means for converging the plurality of first and second output scans onto the fixed path such that the optical output beam from said scanner repetitively scans the fixed path thereby eliminating the effect of the facet to axis errors of the first and second mirrors and doubling the effective scan efficiency of the optical scanner.

2. The optical scanner of claim 1 wherein the first mirror comprises a first polygon mirror and wherein the second mirror comprises a second polygon mirror.

3. The optical scanner of claim 1 wherein said first redirecting means comprises a first prism and wherein said second redirecting means comprises a second prism.

4. The optical scanner of claim 1 wherein the upper input beam is parallel to the lower input beam.

5. The optical scanner of claim 1 wherein the upper input beam is positioned within a first plane and the lower input beam is positioned within a second plane and wherein the first and second planes are parallel.

6. The optical scanner of claim 5 wherein the upper and lower input beams are oriented perpendicular to the first axis of said scanner.

7. The optical scanner of claim 3 wherein said first and second prisms comprise 90° prisms.

8. The optical scanner of claim 7 wherein the first prism is positioned directly above the second prism and wherein the hypotenuse faces of the first and second prisms lie in the same plane.

9. The optical scanner of claim 8 wherein the hypotenuse faces of the first and second prisms are oriented parallel to the first axis of said scanner.

10. The optical scanner of claim 1 wherein the first and second polygon mirrors include an equal number of facets.

11. The optical scanner of claim 1 wherein said converging means includes a positive lens.

12. The optical scanner of claim 1 wherein said first and second polygon mirrors are rotated by a single motor having an output shaft coincident with the first axis of said scanner.

13. The optical scanner of claim 1 wherein said converting means comprises:
   a. segmented reflecting means aligned to receive the input light beam and including a plurality of circumferentially spaced apart mirror facets having a centrally located, vertically oriented axis of rotation and mirror facet to axis errors, said reflecting means including a gap between pairs of adjacent mirror facets;
   b. means for rotating said reflecting means to sequentially reflect the input beam to generate a pulsed beam and a pulsed, non-reflected output beam;
   c. means for redirecting the pulsed beam back onto said reflecting means to generate a redirected pulsed beam vertically displaced from the pulsed beam by a distance related to mirror facet to axis error and laterally offset from the pulsed beam by a distance related to the angle between the mirror facet and the input light beam, wherein the redirected pulsed beam is reflected from each of said mirror facets to generate a pulsed reflected output beam;
   d. means for reflecting the pulsed non-reflected output beam onto the facets of the first polygon mirror to supply the upper input beam; and
   e. means for reflecting the pulsed reflected output beam onto the facets of the second polygon mirror to supply the lower input beams.

14. An optical scanner for receiving an input beam and for generating an optical output beam which repetitively scans a fixed path comprising:
   a. means for converting the input beam into alternating first and second input beams lying within non-intersecting planes;
   b. a first polygonal mirror repetitively rotated through an angle about a first axis for receiving the first input beam and for repetitively generating a first scan;
   c. a second polygonal mirror repetitively rotated through an angle about the first axis for receiving the second input beam and for repetitively generating a second scan, said first and second mirrors having random facet to axis errors and a relative phase angle greater than zero;
   d. first means for redirecting the first scan back onto the first mirror to form a first redirected scan, said first redirecting means including a first reflecting surface lying within a first plane and a second reflecting surface lying within a second plane oriented perpendicular to the first plane, said first and second planes intersecting along a first line oriented perpendicular to the first axis and positioned between the first scan and the first redirected scan, wherein the first redirected scan is reflected from the first mirror to generate a plurality of first output scans which are directed through parallel, non-conincident paths, the first redirected scan being vertically displaced from the first scan by a distance related to the mirror facet to axis error and laterally offset from the first scan by a distance related to the relative angle between the mirror and the first beam and wherein the first and second planes are oriented such that a plane bisecting the included angle between the first and second planes is also oriented perpendicular to the first axis to generate linear output scans in response to the first input beam;
   e. second means for redirecting the second scan back onto the second mirror to form a second redirected scan, said second redirecting means including a third reflecting surface lying within a third plane and a fourth reflecting surface lying within a fourth plane oriented perpendicular to the third plane, said third and fourth planes intersecting along a second line oriented perpendicular to the first axis and positioned between the second scan and the second redirected scan, wherein the second redirected scan is reflected from the second mirror to generate a plurality of second output scans which are directed through parallel, non-coincident paths, the second redirected scan being vertically displaced from the second scan by a distance related to the mirror facet to axis error and laterally displaced from the second scan by a distance related to the relative angle between the mirror and the lower input beam and wherein the third and fourth planes are oriented such that a plane bisecting the included angle between the third and fourth planes is oriented perpendicular to the first axis to generate linear output scans in response to the second input beam; and
   f. means for converging the plurality of first and second output scans onto the fixed path such that the optical output beam from said scanner repetitively scans the fixed path thereby eliminating the effective of the facet to axis errors of the first and second mirrors and doubling the effective mirror scan efficiency.

15. The optical scanner of claim 14 wherein the upper and lower input beams comprise fixed alignment, constant position input beams.

16. The optical scanner of claim 14 wherein the first plane is parallel to the third plane.

17. The optical scanner of claim 16 wherein the second plane is parallel to the fourth plane.

18. The optical scanner of claim 17 wherein said first redirecting means comprises a first prism and wherein said second redirecting means comprises a second prism.

19. The optical scanner of claim 14 wherein said first redirecting means comprises a first prism and wherein said second redirecting means comprises a second prism.

* * * * *